United States Patent [19]

Gellert

[11] Patent Number: 4,468,191
[45] Date of Patent: Aug. 28, 1984

[54] HYDRAULICALLY ACTUATED INJECTION MOLDING SYSTEM WITH ALTERNATE HYDRAULIC CONNECTIONS

[76] Inventor: Jobst U. Gellert, 7A Prince St., Glen Williams, Ontario, Canada

[21] Appl. No.: 485,024

[22] Filed: Apr. 14, 1983

[30] Foreign Application Priority Data

Mar. 24, 1983 [CA] Canada .................................. 424371

[51] Int. Cl.³ .............................................. B29F 1/00
[52] U.S. Cl. ................................ 425/564; 264/328.15; 425/560; 425/572
[58] Field of Search ............... 425/562, 564, 566, 567, 425/568, 569, 571, 572, 544, 560, 561, 577, DIG. 225, DIG. 229, DIG. 224; 264/272.17, 328.9, 328.14, 328.15

[56] References Cited

U.S. PATENT DOCUMENTS

| | | | |
|---|---|---|---|
| 3,904,165 | 9/1975 | DenBoer | 425/577 |
| 4,026,518 | 5/1977 | Gellert | 251/330 |
| 4,043,740 | 8/1977 | Gellert | 425/567 |
| 4,173,448 | 11/1979 | Rees et al. | 425/564 |
| 4,433,969 | 2/1984 | Gellert | 425/548 |

Primary Examiner—Donald Czaja
Assistant Examiner—V. Fischbach
Attorney, Agent, or Firm—Riches, McKenzie & Herbert

[57] ABSTRACT

This invention relates to an injection molding system having a valve pin which is hydraulically actuated between an open and a closed position in which its tip end is seated in a gate leading to the cavity. The actuating mechanism includes a piston secured to the driven end of the valve pin which reciprocates in a cylinder. The cylinder has an inner cylindrical member which is brazed in an outer member with a flanged portion. Separate hydraulic fluid ducts extend from the flanged portion through the outer member, along grooves in the outer wall of the inner member and then through holes through the inner member to conduct hydraulic fluid to opposite sides of the piston. The flanged portion of the outer member has a pair of passages extending through it, each connected to one of the ducts. Alternate ends of the passages are sealed off so that hydraulic fluid may be received either from supply lines drilled through the back plate in which the cylinder is seated or an abutting top plate. This structure provides the advantage that the hydraulic fluid supply lines need not be drilled through the back plate if the system layout is such that there is a danger this could ruin the back plate.

9 Claims, 3 Drawing Figures

HYDRAULICALLY ACTUATED INJECTION MOLDING SYSTEM WITH ALTERNATE HYDRAULIC CONNECTIONS

BACKGROUND OF THE INVENTION

This invention relates to injection molding and more particularly to a hydraulically actuated valve gated system having improved actuating mechanism.

Hydraulically actuated systems are known in the art and examples are disclosed in the applicant's following U.S. patent applications, Ser. No. 399,770 now U.S. Pat. No. 4,433,969 filed July 19, 1982 entitled "Injection Molding Valve Pin Bushing and Method"; Ser. No. 446,460 filed Dec. 3, 1982 entitled "Injection Molding Core Ring Gate"; and Ser. No. 470,192 now abandoned filed Feb. 28, 1983 entitled "Injection Molding Hollow Tip Ring Gate", and the applicant's Canadian application Ser. No. 398,866 filed Mar. 19, 1982 entitled "Hydraulically Actuated Injection Molding System". While these previous hydraulically actuated systems are suitable for many applications, there has been found to be considerable resistance to them due to difficulties experienced in installation. In particular, expensive precision drilling equipment is required to accurately drill lengthy hydraulic fluid supply lines through the back plate in which the hydraulic cylinder is located. Otherwise, there is a danger the hole will stray off-line into the cylinder cavity and ruin the back plate. Therefore, it is desirable to provide an alternative structure whereby the user has the option of not drilling the hydraulic supply lines through the back plate. Furthermore, in order to improve pressure distribution, it is advantageous that the hydraulic fluid be introduced at more than one point on either side of the piston.

SUMMARY OF THE INVENTION

Accordingly, it is an object of the invention to at least partially overcome these problems by providing a hydraulically actuated valve gated injection molding system with an improved structure for supplying hydraulic fluid to opposite sides of the piston.

To this end, in one of its aspects, the invention provides a hydraulically actuated valve gated injection molding system comprising a melt passage which extends from a melt inlet to a gate through a cavity plate leading to a cavity, an elongated valve pin with a driven end and a tip end, and a piston which reciprocates in a cylinder seated in a back plate, the cylinder having at least first and second hydraulic fluid ducts extending therethrough from hydraulic fluid supplies to opposite sides of the piston, the piston being connected to the driven end of the valve pin and hydraulically driven to actuate the valve pin between an open position and a closed position in which the tip end is seated in the gate, the improvement wherein each of the first and second hydraulic fluid ducts has inlet connection means whereby it may be connected to a hydraulic fluid supply line extending through either the back plate or a top plate located adjacent to the back plate.

In another of its aspects, the invention further provides a hydraulically actuated valve gated injection molding system comprising a melt passage which extends from a melt inlet to a gate through a cavity plate leading to a cavity, an elongated valve pin with a driven end and a tip end, and a piston which reciprocates in a cylinder seated in a back plate, the cylinder having at least first and second hydraulic fluid ducts extending therethrough from hydraulic fluid supplies to opposite sides of the piston, the piston being connected to the driven end of the valve pin and hydraulically driven to actuate the valve pin between an open position and a closed position in which the tip end is seated in the gate, the cylinder having a generally cylindrical inner member with an outer surface and an outer member with a flanged portion extending outwardly from a generally cylindrical portion with an inner surface, the inner cylindrical member securely seated in the cylindrical portion of the outer member to receive the piston therein, the outer surface of the inner member abutting against the inner surface of the outer member, the first and second hydraulic fluid ducts extending separately from inlet connection means located in the flanged portion of the outer member, through the cylindrical portion of the outer member to connect with grooves in the outer surface of the inner member which lead to holes extending through the inner member on opposite sides of the piston.

Further objects and advantages of the invention will appear from the following description, taken together with the accompanying drawings.

DESCRIPTION OF THE PREFERRED EMBODIMENTS

Figure 1:
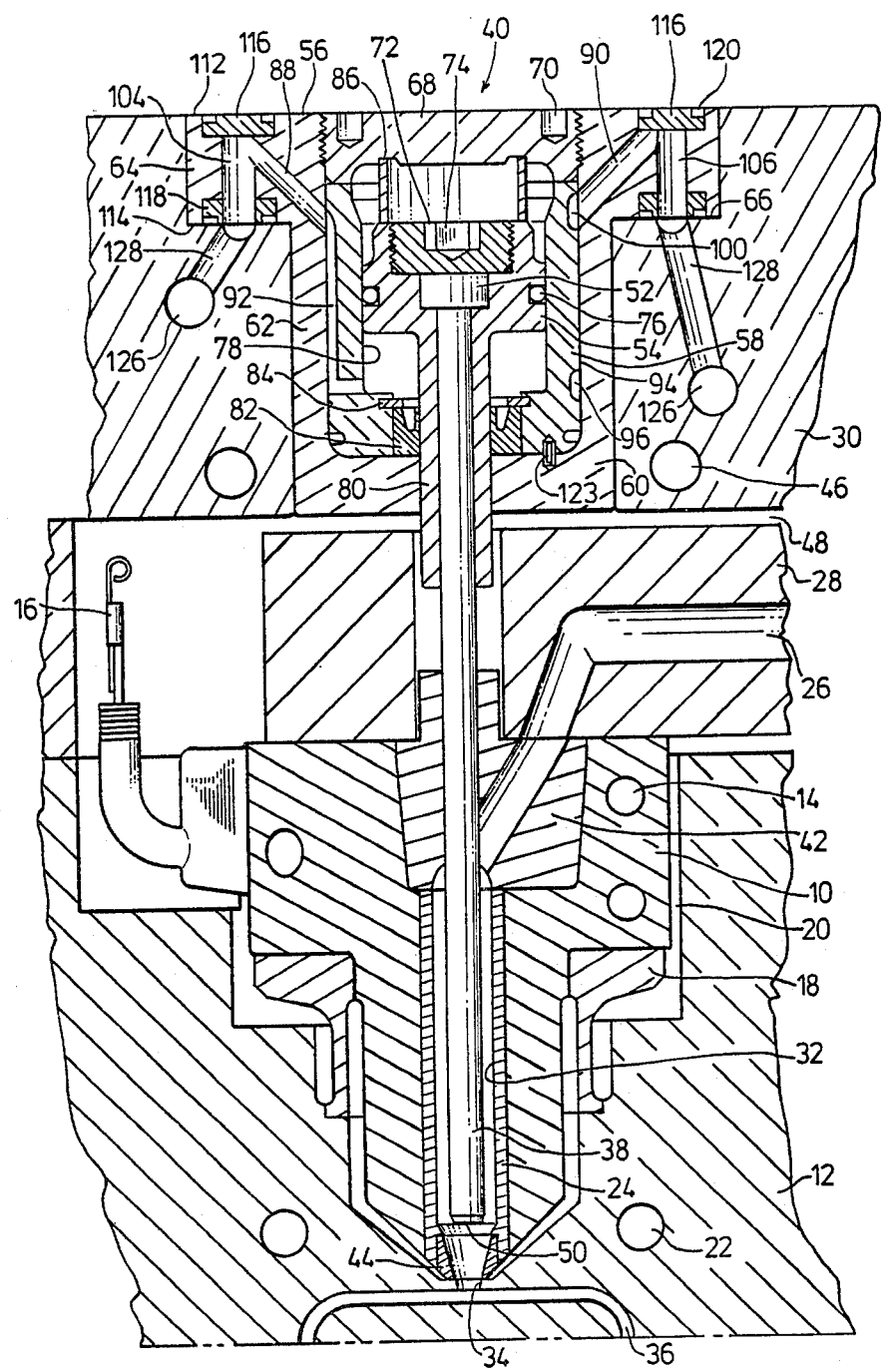
FIG. 1 is a sectional view of a portion of a hydraulically actuated valve gated injection molding system according to a preferred embodiment of the invention in which the hydraulic fluid supply lines extend through the back plate.

Reference is first made to FIG. 1 which shows one heated nozzle 10 of a multi-cavity hydraulically actuated valve gated injection molding system seated in a cavity plate 12. The nozzle 10 has an electric heating element 14 cast into it which receives power through terminals 16. The nozzle 10 is seated in the cavity plate 12 on an insulation bushing 18 which locates it and also provides an air space 20 between it and the cavity plate 12. The cavity plate 12 is cooled by cooling water flowing through the cooling lines 22 and the air space 20 provides the necessary insulation between the hot nozzle 10 and the cool cavity plate 12. In this embodiment, the nozzle 10 is formed of a highly conductive beryllium copper alloy cast around a stainless steel liner 24 and the cavity plate 12 is formed of a suitable high strength steel.

A melt passage 26 branches from a central melt inlet (not shown) through a manifold 28 which extends between the nozzle 10 and a back plate 30. The melt passage extends through a central bore 32 in the nozzle 10 to a gate 34 in the cavity plate 12 which leads to a cavity 36. An elongated valve pin 38 which is reciprocated by hydraulically driven actuating mechanism 40 seated in the back plate 30 also extends through the central bore 32 of the nozzle 10. The melt passage 26 joins the central bore 32 in a stainless steel bushing seal 42 which provides a seal against leakage of the pressurized melt around the reciprocating valve pin 38 as described in the applicant's U.S. Pat. No. 4,026,518 which issued May 31, 1977. The air space 20 is bridged around the gate 34 by a hollow nozzle seal 44 seated in the heated nozzle 10. The nozzle seal 44 prevents the escape of pressurized melt into the air space 20 and is formed of a titanium alloy to conduct the desired amount of heat directly to the gate area as described in the applicant's U.S. Pat. No. 4,043,740 which issued Aug. 23, 1977. The manifold 28, heated nozzle 10 and back plate 30 are secured in place relative to the cavity plate 12 by bolts (not shown) in a conventional manner. The back plate 30 is also cooled by water flowing through cooling lines 46 and is separated from the hot manifold 28 by an air gap 48.

The valve pin 38 has a tip end 50 and a driven end 52 which is connected to the actuating mechanism 40 which reciprocates the valve pin 38 between an open position and a closed position in which the tip end 50 is seated in the gate 34. The actuating mechanism includes a piston 54 which is connected to the driven end 52 of the valve pin 38 and reciprocates inside a cylinder 56 seated in an opening through the back plate 30. The cylinder has a generally cylindrical inner member 58 seated in an outer member 60 which has a cylindrical portion 62 and a flanged portion 64. The outer member 60 is secured in position by bolts (not shown) which extend through it into a shoulder 66 of the back plate 30. The cylinder is sealed by a cap 68 which screws into the outer member 60 and is tightened by a forked wrench (not shown) which has pins that fit into the small holes 70 in the top of the cap 68.

The valve pin 38 extends through the piston 54 and is secured to it by a plug 72 which is tightened against the enlarged driven end 52 using a hexagonal wrench which fits into a socket 74. The piston 54 has an O-ring 76 to provide a seal between it and the inner surface 78 of the inner member 58. A high temperature seal is provided around the neck 80 of the piston 54 by a V-shaped flexible ring 82 which is held in position by an expansion washer 84 seated in a groove. An abutment sleeve 86 is located between the piston 54 and the cap 68 and the extent of travel of the piston 54 and valve pin 38 in the open direction may be adjusted by using a sleeve 86 of a different height.

Figure 3:
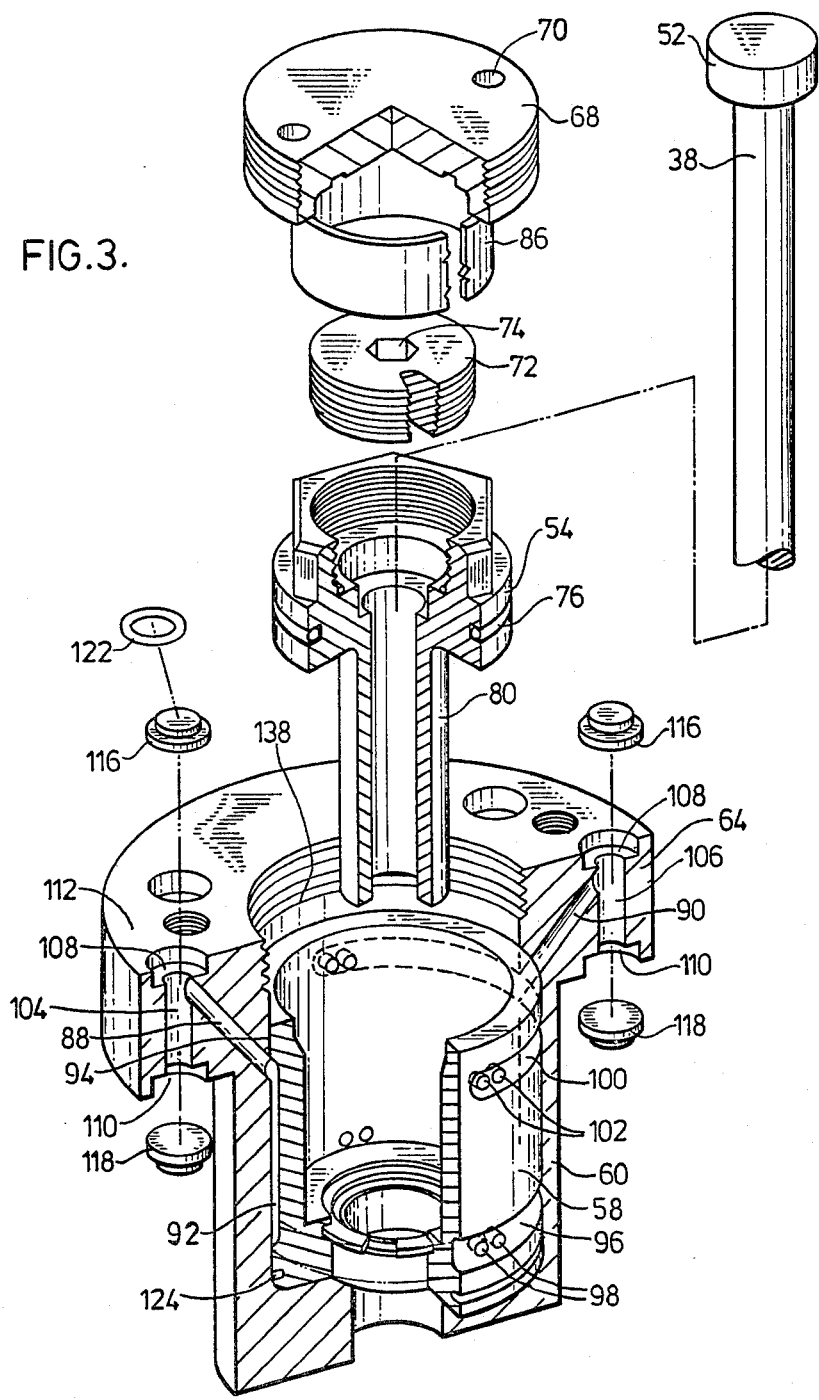
FIG. 3 is an exploded isometric view of the actuating mechanism seen in FIGS. 1 and 2.

As may be seen more clearly in FIG. 3, the cylinder 56 has hydraulic fluid ducts 88,90 which extend from the flanged portion 64 of the outer member 60 through the inner and outer members 58,60 to opposite sides of the piston 54. The first duct 88 for conducting hydraulic fluid to drive the piston to the open position extends through the outer member 60 to connect with a longitudinally extending groove 92 in the outer surface 94 of the inner member 58. The longitudinally extending groove 92 connects with a circumferentially extending groove 96 in the outer surface 94 of the inner member 58 which leads around the inner member to holes 98 extending through it. In the embodiment shown, there are a pair of holes 98 on each side approximately opposite each other to provide for rapid and balanced flow of the hydraulic fluid into and out of the cylinder. The second duct 90 for conducting hydraulic fluid to drive the piston 54 to the closed position extends through the outer member 60 to connect directly with a groove 100 which extends circumferentially part way around the outer surface 94 of the inner member to holes 102 through it. These holes 102 are also arranged with one pair substantially opposite the other pair to provide for balanced flow. The ducts 88,90 extend from opposite sides of the flanged portion 64 and the groove 100 does not, of course, extend all the way around the inner member 58 so as not to intersect the longitudinally extending groove 92 on the other side. Alternate inlet connections are provided by passages 104,106 extending through the flanged portion 64 of the outer member 60 and connecting respectively to the ducts 88,90. The passages 104,106 each have openings 108,110 on opposing faces 112,114 of the flanged portion 64 which are initially sealed by metal plugs 116,118 seated in them. Each of the plugs 116,118 forms a recess 120 to receive an O-ring 122 to provide a seal with a surface abutting against it.

Figure 2:
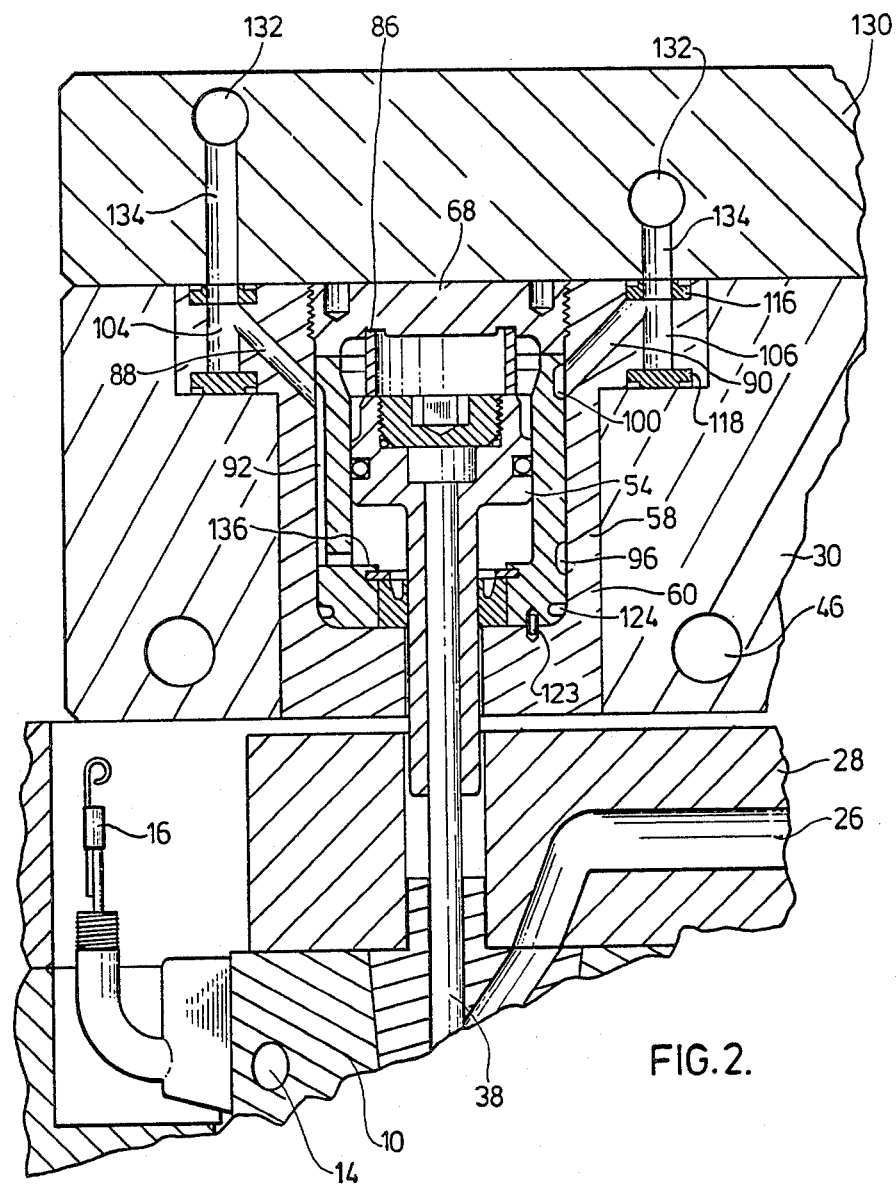
FIG. 2 is a similar view in which the hydraulic fluid supply lines extend through a top plate adjacent the back plate.

Assembly of the preferred embodiment shown is carried out by first forming the cylinder 56 as an integral unit with the inner member 58 and the plugs 116,118 being brazed into the outer member 60. The inner member 58 is inserted into the outer member 60 and they are located relative to each other by locating pin 123. A copper wire is located in a slot 124 extending around the outer surface 94 of the inner member 58 and a copper brazing paste is applied to the outer surface 94 of the inner member 58 and around the metal plugs 116,118. The assembly is then heated in a vacuum furnace which melts the copper and causes it to run around the joints and brazes them to seal the hydraulic fluid ducts 88,90 formed by the various grooves against leakage. The actuating mechanism is assembled in the injection molding system either as shown in FIG. 1 or as shown in FIG. 2. If the system layout does not require the hydraulic fluid supply lines to be too lengthy or if precision drilling equipment is available, then the supply lines 126 may be drilled through the back plate 30 as shown in FIG. 1. In this case, the plugs 118 on the face 114 of the flanged portion 64 abutting against the shoulder 66 of the back plate 30 are drilled out prior to assembly and the passages 104,106 are connected to the supply lines 126 by connecting ducts 128 drilled in the back plate 30. However, if the system layout does require hydraulic fluid supply lines which are so lengthy there is a danger drilling them through the back plate 30 could ruin the back plate, then a separate top plate 130 is used as shown in FIG. 2. The top plate 130 is fixed to the back plate 30 by bolts (not shown) and the supply lines 132 are drilled through the top plate 130 rather than through the back plate 30. In this case, the plugs 116 on the face 112 of the flanged portion 64 abutting against the top plate 130 are drilled out prior to assembly and the passages 104,106 are connected to the supply lines 132 by connecting ducts 134 drilled in the top plate 130.

In use, following assembly of the system as shown in either FIG. 1 of FIG. 2, electrical power is applied to the terminals 16 and the heating element 14 heats the nozzle 10 up to a predetermined operating temperature. Pressurized plastic melt is then introduced into the melt passage 26 from a molding machine (not shown). Pressurized hydraulic fluid is then applied to the hydraulic fluid supply lines 126 or 132 according to a predetermined cycle by conventional means (not shown). First, a higher pressure is applied to the supply line leading to duct 88 which drives the piston 54 to the open position shown in abutment against sleeve 86. This, of course, opens the gate 34 and the melt flows through the gate and fills the cavity 36. After the high injection pressure has been held for a short period to pack the melt, the hydraulic pressure is reversed which actuates the piston 54 and valve pin 38 to the closed position with the tip end 50 seated on the gate. The melt injection pressure is then released and the mold is opened for ejection after a short cooling period. The mold is then reclosed, the hydraulic pressure reversed again to reciprocate the piston 54 and valve pin 38 to the open position, and the high injection pressure reapplied. This sequence is repeated several times per minute and it is necessary that the system be capable of operating for a long period of time without malfunctioning.

As described in the applicant's above mentioned Canadian patent application Ser. No. 398,866, the piston 54 has a positive stop in the closed position in that it abuts against shoulder 136. This requires that the valve pin 38 be the exact length to seat in the gate 34 at the same time. If the valve pin 38 is too long it will impact against the valve gate 34 in the cavity plate 12 and eventually break it. If the valve pin is too short, it will not seat properly in the closed position, resulting in leakage or drooling when the mold is opened or leaving an unsightly gate mark on the molded product. Therefore, it is necessary to measure each system when it is bench tested and then adjust the length of the valve pin 38 accordingly, making allowance for heat expansion during operation. This is possible with the present system due to the provision of the removable cap 68 which is seated in the mouth 138 of the cylinder which is larger in diameter than the piston 54. Thus the system may be assembled together according to operational requirements except that the cap 68, sleeve 86, piston 54, valve pin 38 and plug 72 are not inserted. The cylinder 56 and other components of the system must be bolted in position and tightened to the required torque to simulate actual operating conditions. A micrometer (not shown) is then inserted through the mouth 138 of the cylinder to measure the distances first to the shoulder 136 and then to the cavity 36 to determine the exact necessary length of the valve pin 38 from the enlarged driven end 52 to the tip end 50. A valve pin 38 of the appropriate length is then selected or made and the large size of the mouth enables the valve pin 38 and piston 54 to be assembled and inserted without disassembling the rest of the system. Thus, a relatively easy and convenient procedure is provided for carrying out these measurements after most of the system has been assembled and it is not necessary to adjust the assembly of that portion of the system after doing so.

Although the description of this injection molding system has been given with respect to particular embodiments of the invention, it is not to be construed in a limiting sense. Variations and modifications will occur to those skilled in the art. For instance, different types of alternate inlet connections to the ducts 88,90 may be provided other than passages 104,106 sealed by plugs 116,118, one of which is drilled out. For a definition of the invention, reference is made to the attached claims.

What I claim is:

1. In a hydraulically actuated valve gated injection molding system comprising a melt passage which extends from a melt inlet to a gate through a cavity plate leading to a cavity, an elongated valve pin with a driven end and a tip end, and a piston which reciprocates in a cylinder seated in a back plate, the cylinder having at least first and second hydraulic fluid ducts extending therethrough from hydraulic fluid supplies to opposite sides of the piston, the piston being connected to the driven end of the valve pin and hydraulically driven to actuate the valve pin between an open position and a closed position in which the tip end is seated in the gate, the improvement wherein;

each of the first and second hydraulic fluid ducts has inlet connection means whereby it may be connected to a hydraulic fluid supply line extending through either the back plate or a top plate located adjacent to the back plate.

2. A hydraulically actuated valve gated injection molding system as claimed in claim 1 wherein the cylinder has a generally cylindrical inner member with an outer surface and an outer member with a flanged portion extending outwardly from a generally cylindrical portion with an inner surface, the inner cylindrical member securely seated in the cylindrical portion of the outer member to receive the piston therein, the outer surface of the inner member abutting against the inner surface of the outer member, the first and second hydraulic fluid ducts extending separately from the inlet connection means located in the flanged portion of the outer member, through the cylindrical portion of the outer member to connect with grooves in the outer surface of the inner member which leads to holes extending through the inner member on opposite sides of the piston.

3. A hydraulically actuated valve gated injection molding system as claimed in claim 2 wherein the flanged portion of the outer member has opposing faces and the inlet connection means each comprise a passage which extends laterally through the flanged portion between an opening on each of the two faces and connects with one of the hydraulic fluid ducts, the passage having openable closure means located on opposite sides of the hydraulic fluid duct connection whereby hydraulic fluid may be received through the opening on a selected one of the two faces.

4. A hydraulically actuated valve gated injection molding system as claimed in claim 3 wherein the closure means in the passage through the flanged portion of the outer member of the cylinder comprises metal plugs which is brazed in the openings at the opposing faces of the flanged portion, whereby a selected one of the closure means may be opened prior to assembly of the system by drilling through it.

5. A hydraulically actuated valve gated injection molding system as claimed in claim 2 wherein one hydraulic fluid duct extending through the outer member connects first with a longitudinally extending groove in the outer surface of the inner member which then connects with a circumferentially extending groove which leads to two first holes through the inner member substantially opposite to each other, and the other hydraulic fluid duct extending through the outer member connects with a separate circumferentially extending groove which leads to two second holes through the inner member substantially opposite to each other, the first and second holes being on opposite sides of the piston.

6. A hydraulically actuated valve gated injection molding system as claimed in claim 1 wherein the outer member of the cylinder is brazed into the inner member of the cylinder to form an integral unit.

7. A hydraulically actuated valve gated injection molding system comprising a melt passage which extends from a melt inlet to a gate through a cavity plate leading to a cavity, an elongated valve pin with a driven end and a tip end, and a piston which reciprocates in a cylinder seated in a back plate, the cylinder having at least first and second hydraulic fluid ducts extending therethrough from hydraulic fluid supplies to opposite sides of the piston, the piston being connected to the driven end of the valve pin and hydraulically driven to actuate the valve pin between an open position and a closed position in which the tip end is seated in the gate, the cylinder having a generally cylindrical inner member with an outer surface and an outer member with a flanged portion extending outwardly from a generally cylindrical portion with an inner surface, the inner cylindrical member securely seated in the cylindrical portion of the outer member to receive the piston therein, the outer surface of the inner member abutting against the inner surface of the outer member, the first and second hydraulic fluid ducts extending separately from inlet connection means located in the flanged portion of the outer member, through the cylindrical portion of the outer member to connect with grooves in the outer surface of the inner member which lead to holes extending through the inner member on opposite sides of the piston.

8. A hydraulically actuated valve gated injection molding system as claimed in claim 7 wherein one hydraulic fluid duct extending through the outer member connects first with a longitudinally extending groove in the outer surface of the inner member which then connects with a circumferentially extending groove which leads to two first holes through the inner member substantially opposite to each other, and the other hydraulic fluid duct extending through the outer member connects with a separate circumferentially extending groove which leads to two second holes through the inner member substantially opposite to each other, the first and second holes being on opposite sides of the piston.

9. A hydraulically actuated valve gated injection molding system as claimed in claim 7 wherein the outer member of the cylinder is brazed into the inner member of the cylinder to form an integral unit.

* * * * *